United States Patent
Chae et al.

(10) Patent No.: US 11,051,204 B2
(45) Date of Patent: Jun. 29, 2021

(54) METHOD AND APPARATUS FOR PERFORMING BEAM SEARCH OR BEAM TRANSMISSION BASED ON LOCATION ERROR INFORMATION IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 51 days.

(21) Appl. No.: 16/477,825

(22) PCT Filed: Jan. 12, 2018

(86) PCT No.: PCT/KR2018/000621
§ 371 (c)(1),
(2) Date: Jul. 12, 2019

(87) PCT Pub. No.: WO2018/131934
PCT Pub. Date: Jul. 19, 2018

(65) Prior Publication Data
US 2020/0128436 A1  Apr. 23, 2020

Related U.S. Application Data
(60) Provisional application No. 62/445,725, filed on Jan. 12, 2017.

(51) Int. Cl.
*H04L 12/923* (2013.01)
*H04W 28/02* (2009.01)
(Continued)

(52) U.S. Cl.
CPC ....... *H04W 28/0289* (2013.01); *H04W 24/08* (2013.01); *H04W 72/1252* (2013.01); *H04W 72/1284* (2013.01)

(58) Field of Classification Search
None
See application file for complete search history.

(56) References Cited

U.S. PATENT DOCUMENTS

2013/0308717 A1  11/2013  Maltsev et al.
2015/0045048 A1   2/2015  Xu et al.
(Continued)

FOREIGN PATENT DOCUMENTS

KR  101300837  8/2013
KR  101499384  3/2015

OTHER PUBLICATIONS

PCT International Application No. PCT/KR2018/000621, Written Opinion of the International Searching Authority dated Apr. 23, 2018, 15 pages.

*Primary Examiner* — Sithu Ko
(74) *Attorney, Agent, or Firm* — Lee, Hong, Degerman, Kang & Waimey PC

(57) ABSTRACT

One embodiment of the present invention relates to a method for performing a beam search and transmitting a signal in which a first terminal using an mmWave band performs a beam search and transmits a signal in a wireless communication system, comprising the steps of: receiving error information relating to the location of a second terminal; determining at least one of beam direction, beam search performing range, and beam search performing order using the error information for the second terminal; performing a beam search according to the determination that is made;

(Continued)

and transmitting a signal to the second terminal through beamforming in accordance with the result of the beam search.

11 Claims, 13 Drawing Sheets

(51) Int. Cl.
*H04W 24/08* (2009.01)
*H04W 72/12* (2009.01)

(56) References Cited

U.S. PATENT DOCUMENTS

| | | |
|---|---|---|
| 2016/0211898 A1 | 7/2016 | Cai |
| 2017/0188391 A1* | 6/2017 | Rajagopal ......... H04W 74/0816 |
| 2018/0042023 A1* | 2/2018 | Sheng ................... H04W 48/12 |
| 2018/0048572 A1* | 2/2018 | Gulati ..................... H04L 47/24 |
| 2018/0124771 A1* | 5/2018 | Mok ................. H04W 36/0072 |
| 2019/0150197 A1* | 5/2019 | Sheu ..................... H04W 72/02 |
| | | 370/329 |
| 2019/0173613 A1* | 6/2019 | Sorrentino ............ H04L 1/0029 |
| 2019/0182840 A1* | 6/2019 | Feng ....................... H04W 4/44 |
| 2019/0313279 A1* | 10/2019 | Li ..................... H04W 28/0289 |

* cited by examiner

FIG. 5
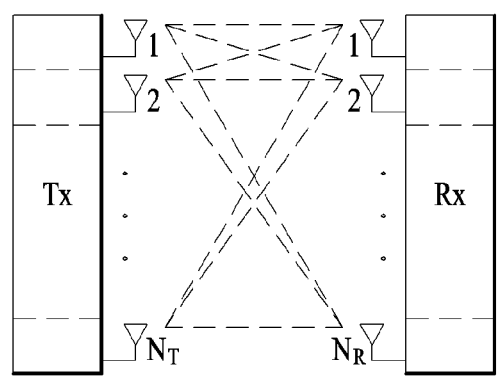
(a)
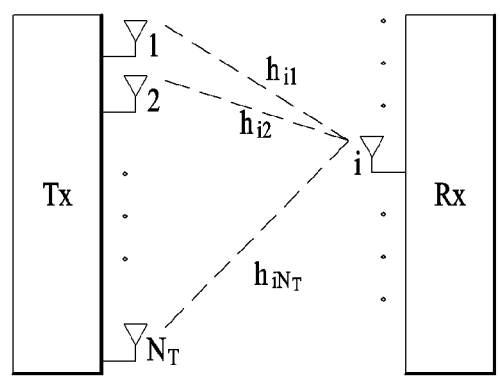
(b)

FIG. 8
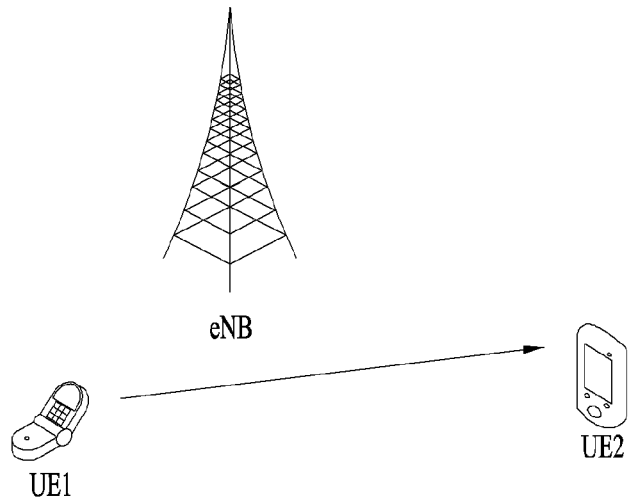
(a)
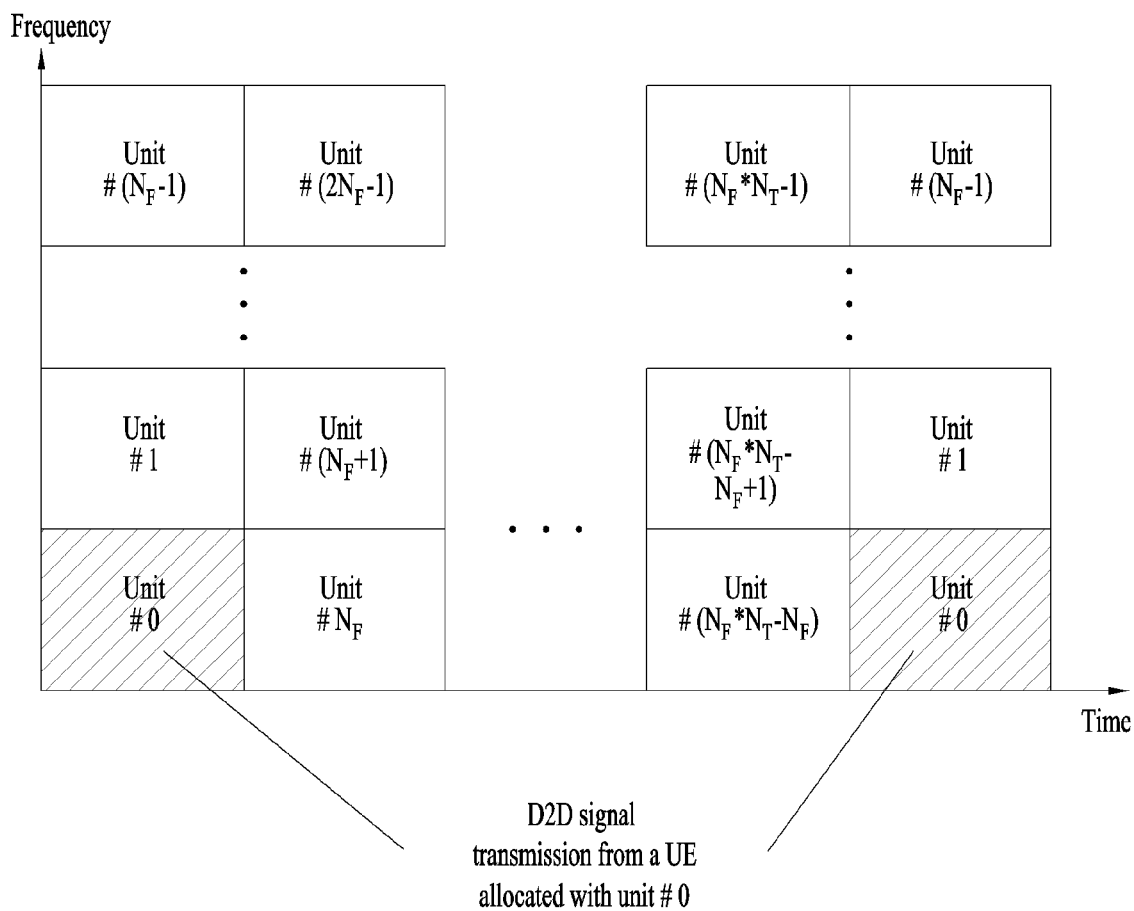
D2D signal transmission from a UE allocated with unit # 0
(b)

METHOD AND APPARATUS FOR PERFORMING BEAM SEARCH OR BEAM TRANSMISSION BASED ON LOCATION ERROR INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2018/000621, filed on Jan. 12, 2018 which claims the benefit of U.S. Provisional Application No. 62/445,725, filed on Jan. 12, 2017, the contents of which are all hereby incorporated by reference herein in their entirety.

TECHNICAL FIELD

The following description relates to a wireless communication system, and more particularly to a method and apparatus for performing beam search or beam transmission based on location error information.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An object of the present disclosure is to provide a method for changing a beam direction, width, and beam sweeping order for performing beam sweeping using a location estimation error of a terminal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present invention, provided herein is a method for performing a beam search and transmitting a signal by a first terminal using a mmWave band in a wireless communication system, the method including receiving error information related to a location of a second terminal, determining, using error information about a second terminal, one or more of a beam direction, a range for performing the beam search, and an order in which the beam search is to be performed, performing the beam search according to the determination, and transmitting a signal to the second terminal through beamforming according to a result of the beam search.

In another aspect of the present invention, provided herein is a first terminal using a mmWave band to perform a beam search and transmit a signal in a wireless communication system, the first terminal including a transmitting device and a receiving device, and a processor, wherein the processor is configured to receive error information related to a location of a second terminal, determine, using error information about a second terminal, one or more of a beam direction, a range for performing the beam search, and an order in which the beam search is to be performed, perform the beam search according to the determination, and transmit a signal to the second terminal through beamforming according to a result of the beam search.

The error information may be an error range producible when a terminal measures a location thereof.

The first terminal may determine a Line of Sight (LOS) range not deviating from an error range of the second terminal indicated by the error information as a range for performing the beam search.

The first terminal may preferentially perform the beam search in a Line of Sight (LOS) range not deviating from an error range of the second terminal indicated by the error information.

When the first terminal determines the LOS range not deviating from the error range of the second terminal, an error range of the first terminal may be considered as well.

When the first terminal determines the LOS range not deviating from the error range of the second terminal, the first terminal may consider the entire LOS range not deviating from the error range of the second terminal at all locations within the error range of the first terminal.

The first terminal may select, from among all beams available to the first terminal, one or more beams corresponding to an error range of a second terminal indicated by the error information as beams to be used for the beam search.

The first terminal may perform the beam search using all the selected one or more beams during a time for which one beam selected by the second terminal is transmitted as a beam to be used for the beam search performed by the second terminal.

The performing of the beam search by the first terminal using all the selected one or more beams may be repeated until all beams selected by the second terminal are transmitted.

The beams selected by the second terminal may correspond to an error range of the first terminal indicated by error information related to a location of the first terminal among all beams available to the second terminal.

The error information may be information indicating that the error range is in one of a polygonal shape, a circular shape, or an elliptical shape.

When the error range is in the polygonal shape, the error information may include information indicating vertices of a polygon, wherein, when the error range is in the circular shape, the error information may include information indicating a center point and a radius, and wherein, when the error range is in the elliptical shape, the error information includes information indicating two focal points and a focal distance.

The terminals may measure locations thereof through one or more of a Global Positioning System (GPS) signal and Observed Time Difference Of Arrival (OTDOA).

Advantageous Effects

According to embodiments of the present invention, beam search may be more quickly and more accurately performed by changing the direction, width, beam sweeping order, and the like of the beam for performing beam sweeping, using a location estimation error of a terminal.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

BEST MODE

Figure 1:
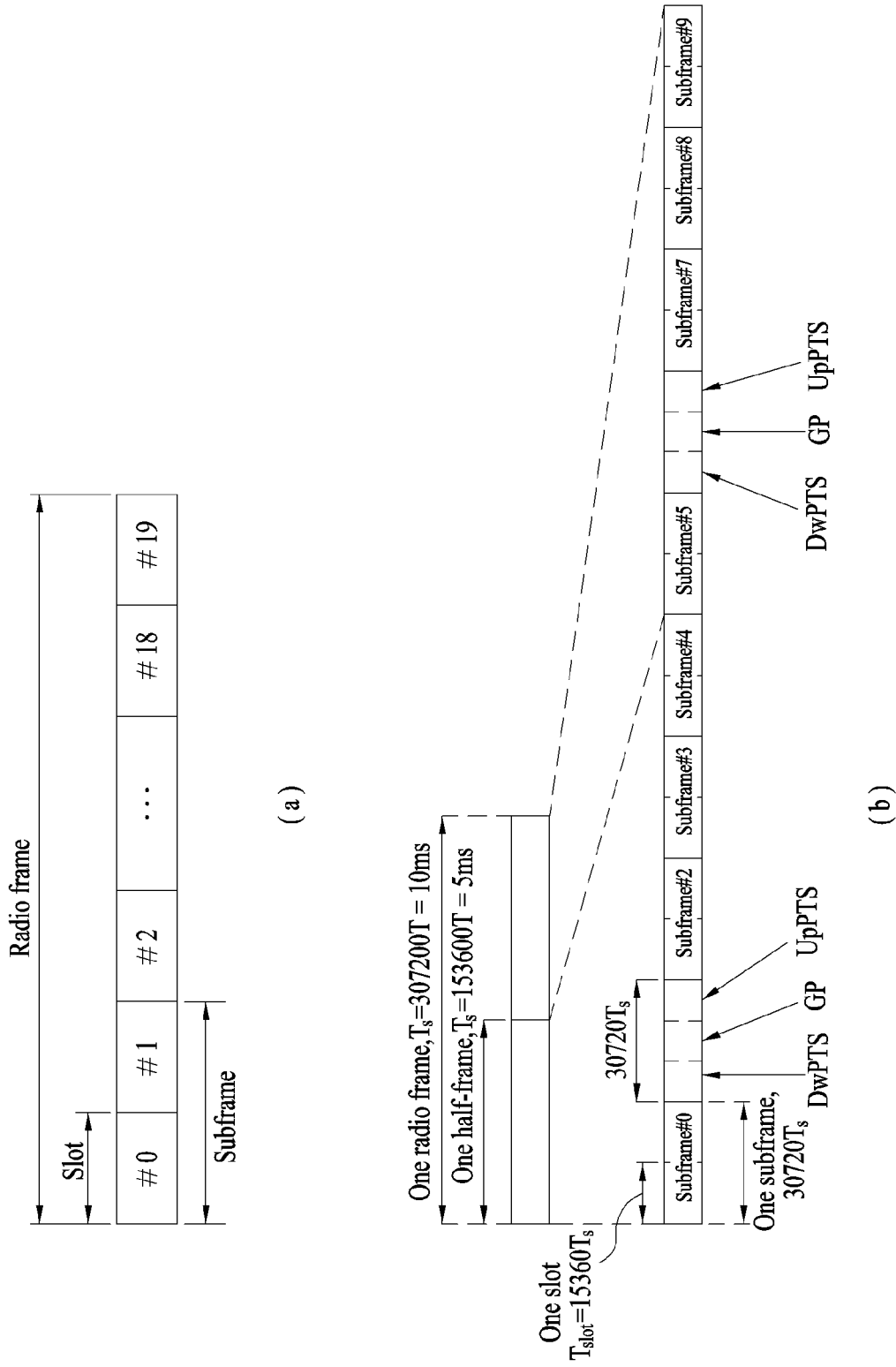
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
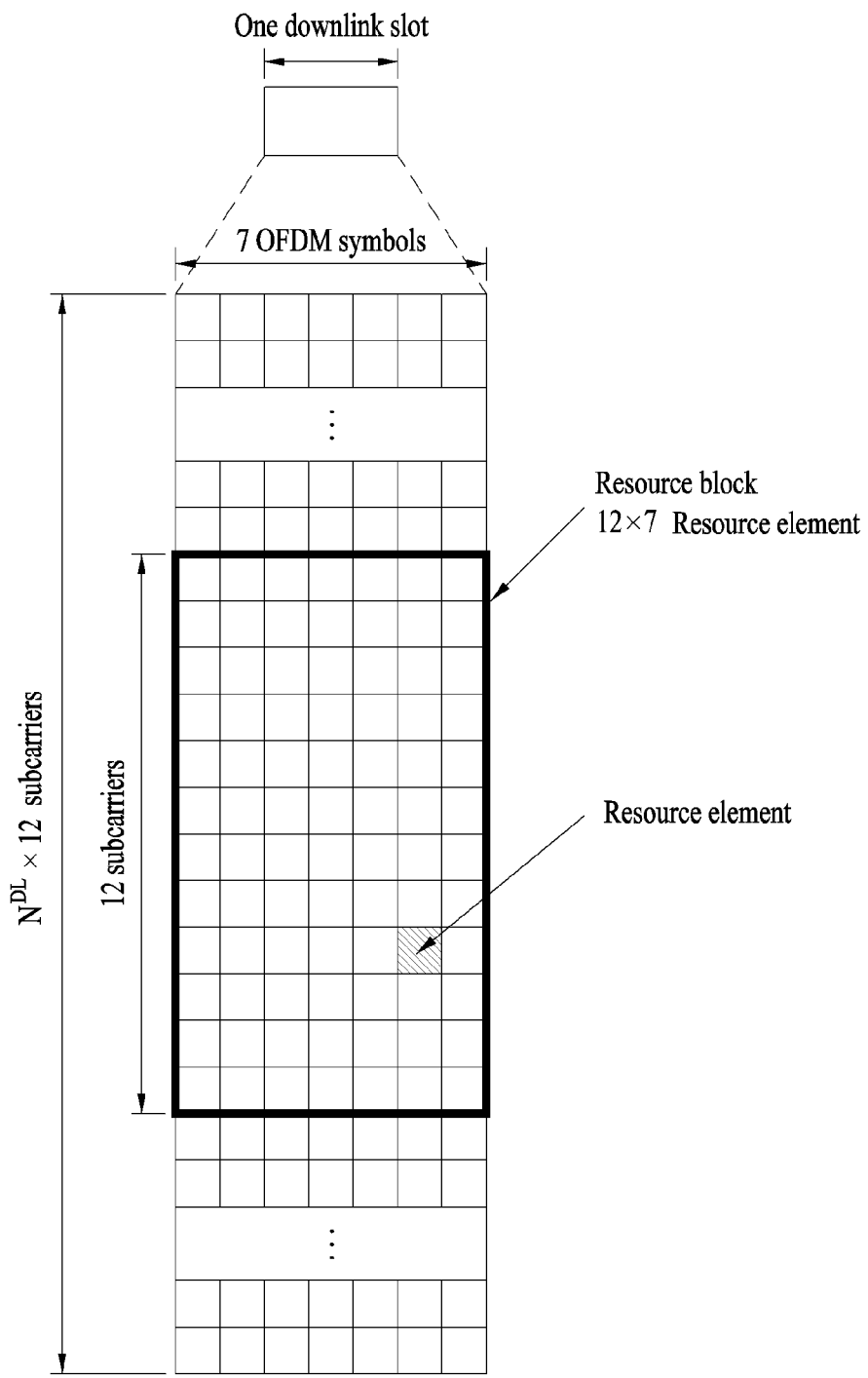
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
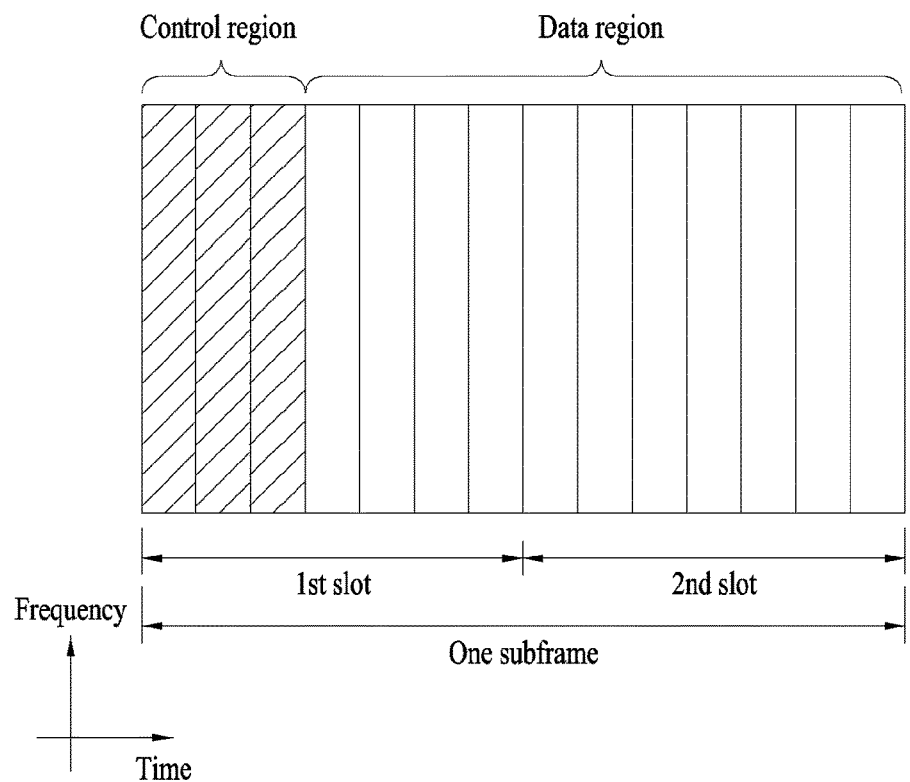
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
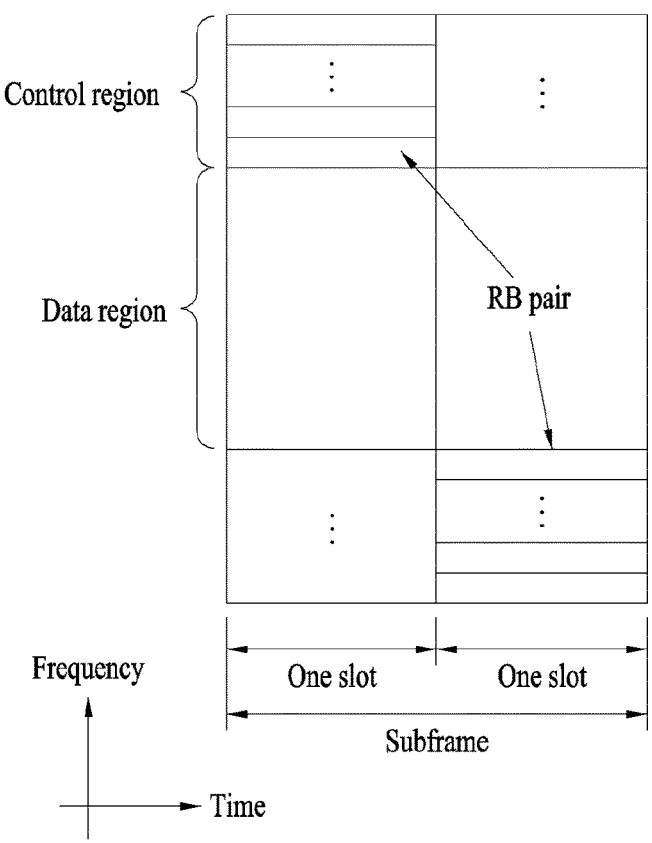
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Equation 3]}$$

In addition, ŝ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector ŝ having the adjusted transmit powers, the weight matrix W serves to appropriately distribute the transmission information to each antenna according to a transport channel state. $x^1, x^2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1,y_2,\ldots,y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1},h_{i2},\ldots,h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n=[n_1,n_2,\ldots,n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
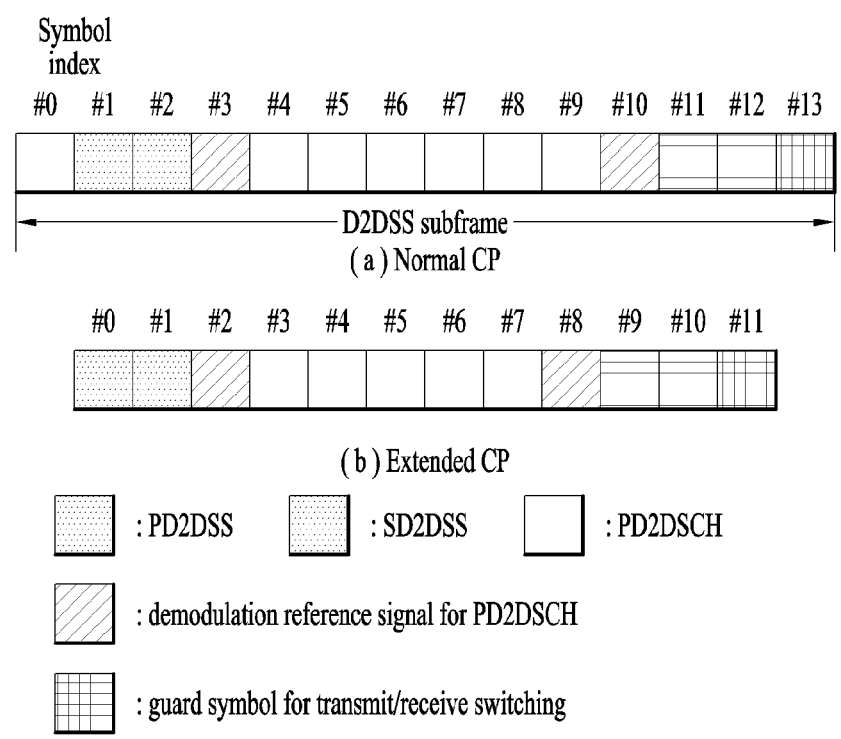
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
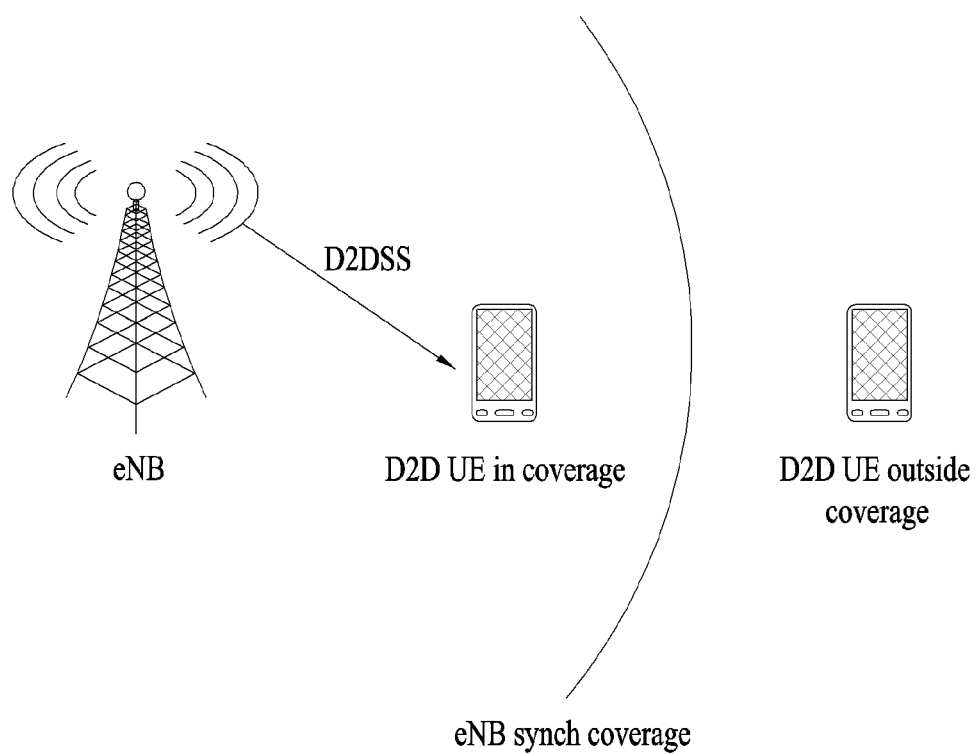
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F * N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
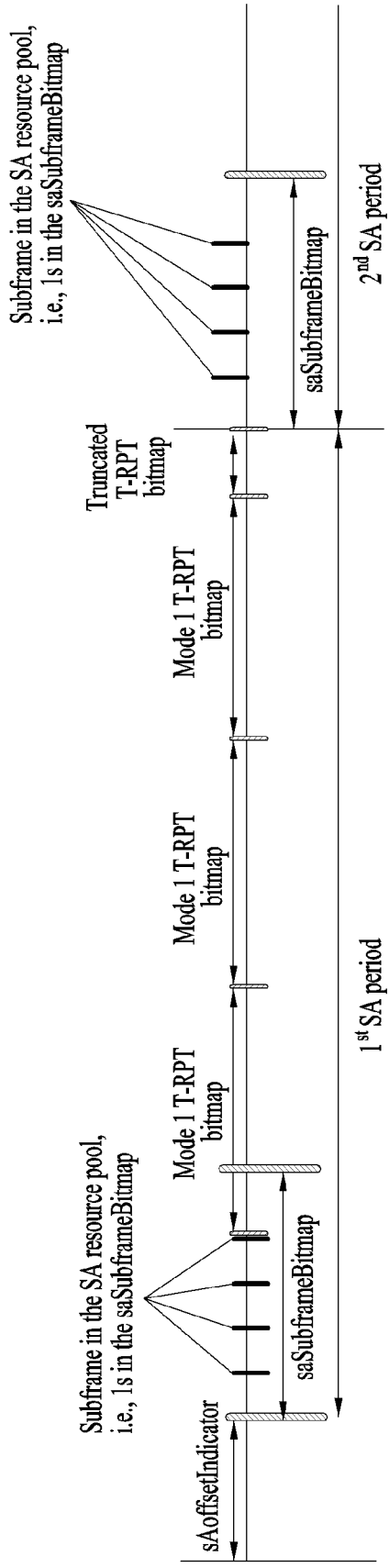
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

In vehicle-to-vehicle communication, a Cooperative Awareness Message (CAM) of a periodic message type, a Decentralized Environmental Notification Message (DENM) of an event triggered message type, and the like may be transmitted. The CAM may contain basic vehicle information such as dynamic state information about a vehicle including the direction and speed, static vehicle data such as dimensions, external lighting conditions, and route history. The size of the CAM message may be 50 to 300 bytes. The CAM message shall be broadcast and the latency shall be shorter than 100 ms. The DENM may be a message generated in an unexpected situation such as a vehicle malfunction or an accident. The size of the DENM may be less than 3000 bytes, and any vehicle within the transmission range may receive the message. In this case, the DENM may have a higher priority than the CAM. Having a high priority may mean that when transmissions are triggered simultaneously from the perspective of a UE, a transmission with a higher priority is preferentially performed, or mean that transmission of a message with a higher priority among multiple messages is preferentially attempted in terms of time. From the perspective of multiple UEs, a message with a higher priority may be set to be less subjected to interference than a message with a lower priority to lower the probability of reception errors. When security overhead is included, CAM may have a larger message size than when the security overhead is not included.

NR (New Radio Access Technology (RAT))

As more and more communication devices require higher communication capacity, there is a need for mobile broadband communication improved over the existing radio access technology. Massive Machine Type Communications (MTC), which provide various services anywhere anytime by connecting many devices and objects, is one of the major issues to be considered in next generation communication. In addition, communication system design considering services/UEs sensitive to reliability and latency is under discussion. As such, introduction of next-generation radio access technology considering enhanced mobile broadband communication, massive MTC, and Ultra-Reliable and Low Latency Communication (URLLC) is being discussed. In the present disclosure, such technology is referred to as NR for simplicity.

Figure 10:
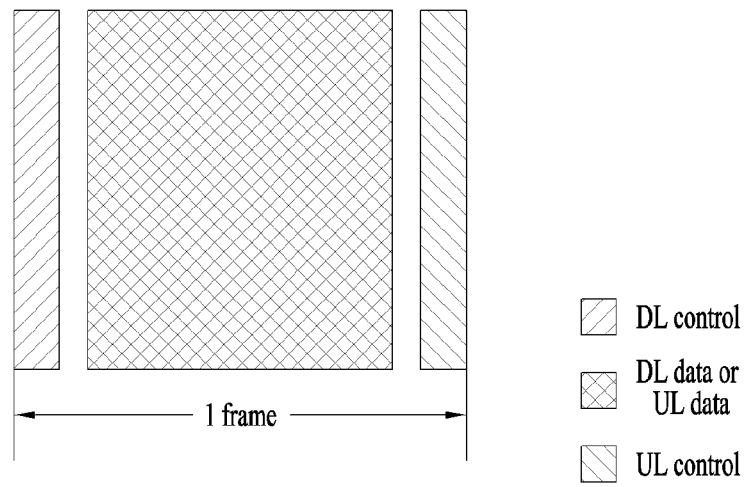
FIG. 10 illustrates a frame structure that is usable in new Radio Access Technology (RAT)
Figure 11:
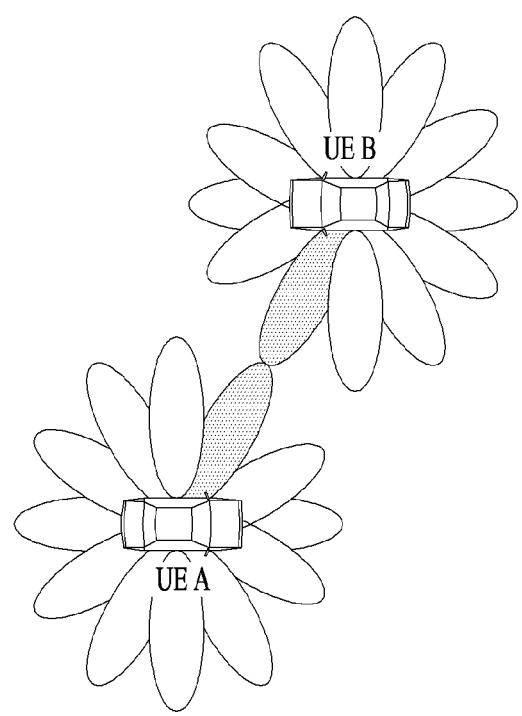
FIG. 11 illustrates an example of beamforming in V2X communication.

FIG. 10 illustrates a frame structure that is usable in NR. Referring to FIG. 10, a self-contained structure is configured in which a DL control channel, a DL or an UL data, and a UL control channel may all be included in one frame unit. On the DL control channel, DL data scheduling information, UL data scheduling information, and the like may be transmitted. On the UL control channel, ACK/NACK information for DL data, CSI information (modulation and coding scheme information, MIMO transmission related information, etc.), a scheduling request, and the like may be transmitted. There may be a time gap for DL-to-UL or UL-to-DL switching between the control and data regions. In addition, some of DL control/DL data/UL data/UL control may not be configured in one frame. Alternatively, the order thereof may be changed according to the respective channels constituting one frame (e.g., DL control/DL data/UL control/UL data or UL control/UL data/DL control/DL data).

Analog Beamforming

In the mmW/mmWave system, a short wavelength is used, and thus a plurality of antennas can be installed in the same area. In other words, the wavelength in the 30 GHz band is 1 cm, and accordingly a total of 100 antenna elements may be installed in a 2-dimensional array at intervals of 0.5 lambda (wavelength) on a 5 by 5 cm panel. Therefore, in the mmW system, multiple antenna elements may be used to increase the beamforming (BF) gain to enhance the coverage or the throughput.

In this case, if each antenna element is provided with a transceiver unit (TXRU) to enable adjustment of transmit power and phase per antenna element, independent beamforming may be performed for each frequency resource. However, installing TXRUs in all the 100 antenna elements is less feasible in terms of cost. Therefore, a method of mapping a plurality of antenna elements to one TXRU and adjusting the direction of a beam using an analog phase shifter has been considered. However, this analog beamforming technique is disadvantageous in that frequency selective beamforming is not allowed because only one beam direction can be created over the full band.

As an intermediate form of digital BF and analog BF, hybrid BF with B TXRUs which are fewer than Q antenna elements may be considered. In the hybrid BF, the number of directions in which beams are allowed to be transmitted at the same time is limited to B or less, though it depends on how the B TXRUs and Q antenna elements are connected.

Embodiments

Hereinafter, methods of performing beam search and transmitting/receiving signals using location information and error information related thereto will be described based on the above description. A method of performing beam scanning more quickly and more accurately by changing at least one of a beam direction, a beam width, and a beam sweeping order for beam sweeping using a location estimation error of a terminal is disclosed. Prior to the description of the embodiment of the present invention, beam search in mmWave will be described. When a transmitting terminal has M Tx (analog) beams and a receiving terminal has N Rx (analog) beams, at least M*N beams search (time) intervals are required. In particular, a quick search time is required for a fast moving terminal such as a vehicle. In such a situation, if the location information about the terminal is available, the beam search time (length) may be reduced. For example, if the location of the terminal is pre-recognized, the LoS direction may be known in advance, and thus beamforming can be performed in the corresponding direction. In addition, since beam searching can be performed in that direction, the beam searching time may be reduced.

When a majority of the beam is in the LoS region in mmWave, a link may be formed as to enable communication. This effect may differ among frequencies. For example, at 28 GHz, non-line-of-sight (NLOS) regions are also known to have a significant effect on the link gain. However, at 60 GHz, it is known that the LOS path has a dominant effect on the link gain in most cases.

In a low frequency band or a mmWave band, a UE may share the location information thereabout with neighboring UEs using an omnidirectional beam. However, performing beamforming using only the location information shared by the UEs may have a risk because the direction in which an actual radio link is formed may not necessarily be the LOS direction, and there may be an error in the location estimation. Therefore, each UE may signal, to neighboring UEs, estimated location thereof (or the location measured by the UE using a GPS signal or a method such as Observed Time Difference of Arrival (OTDOA)) and error information about the corresponding location (an error range; for example, a range of error that may be produced when the UE measures the location thereof using a measurement method such as GPS or OTDOA (wherein the location information and/or error information may be transmitted in the mmWave band, or transmitted using a low frequency band or omnibeam. For example, the location information and/or error information may be transmitted in the existing LTE frequency band).

A first UE having received the error information related to the location of a second UE may determine one or more of the beam direction, the range for performing the beam search, and the order in which the beam search is to be performed, using the error information about the second UE, and then perform the beam search according to the determination. Then, according to the beam search result, the UE may transmit a signal to the second UE through the beamforming (in the beam direction by the beam search result) or receive a signal of the second UE in the beam direction by the beam search result.

Figure 12:
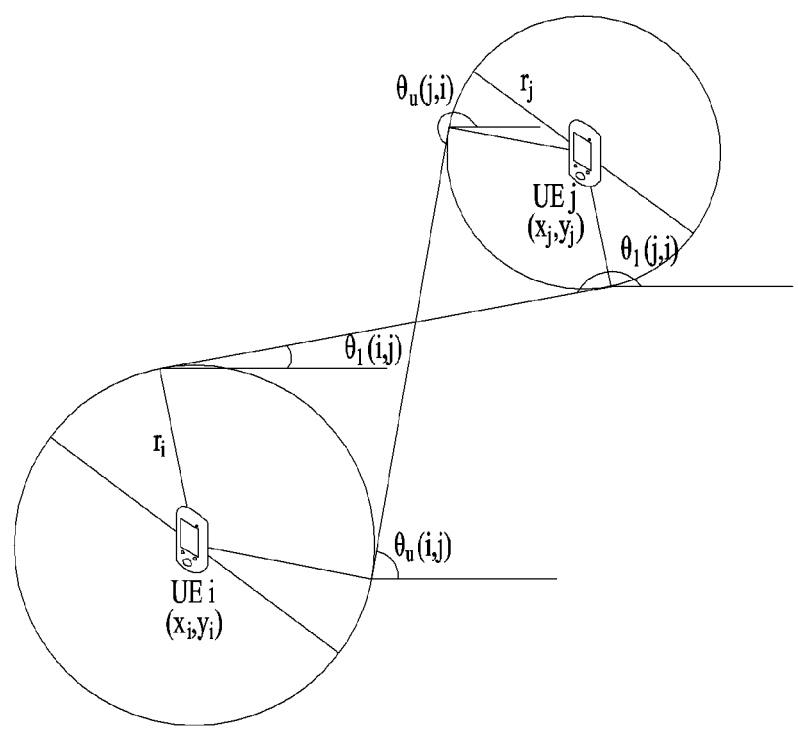
FIG. 12 illustrates determining a beam search area according to an embodiment of the present invention.

Here, the first UE may determine the range of a Line of Sight (LOS) range that does not deviate from the error range of the second UE indicated in the error information, as a range in which the beam search is to be performed. When the first UE determines the LOS range that does not deviate from the error range of the second UE, the error range of the first UE may be considered as well. That is, when the first UE determines a LOS range that does not deviate from the error range of the second UE, the first UE may consider the entire LOS ranges that do not deviate from the error range of the second UE at all locations within the error range of the first UE. In this regard, a detailed description will be made with reference to FIG. 12. Referring to FIG. 12, UE i and UE j each have a circular error range (identified by the error information). From the perspective of UE i, beam sweeping may be performed preferentially or only in a LOS range that does not deviate from the error range of UE j (a circle having a radius of $r_j$ with respect to UE j). However, since the location that UE i has measured may have an error, UE i does not know the accurate location thereof. Accordingly, UE i determines the LOS range that does not deviate from the error range of UE j in all locations within the error range of the location it measured (within a circle having a radius of $r_i$ with respect to UE i). Then, the UE may perform beam sweeping preferentially in the determined range or only in the determined range. The LOS range that does not deviate from the error range of UE j at all locations in the error range of the location measured by a UE corresponds to $\theta_l(i,j) \leq \theta_i \leq \theta_u(i,j)$ in FIG. 12. Therefore, UE i may perform beam sweeping preferentially in the range of $\theta_l(i,j) \leq \theta_i \leq \theta_u(i,j)$, or perform fine beam sweeping only within the range. In this way, the beam sweeping range may be narrowed to find a beam in a shorter time, or to enable search for a finer beam within the same time to perform more accurate beamforming.

Also, the first UE may preferentially perform the beam search in the LOS range that does not deviate from the error range of the second UE indicated by the error information. Similarly, the first UE and the second UE may reorder the beam search/beam sweeping order based on the error information to reduce the beam search time. Specifically, the first UE may select, from among all beams available to the first UE, one or more beams corresponding to the error range of the second UE indicated by the error information as beams to be used for beam search. During the time for which one beam selected by the second UE is transmitted as a beam for the beam search performed by the second UE, the first UE performs the beam search using all the selected one or more beams. Herein, performing the beam search using all the one or more beams selected by the first UE may be repeated until all the beams selected by the second UE are transmitted. The beam selected by the second UE corresponds to the error range of the first UE indicated by the error information related to the location of the first UE among all beams available to the second UE.

Such beam sweeping will be described in detail with reference to FIG. 13. The receiving UE performs the search operation by giving priority to a beam in the expected LOS direction obtained through the location information (or reordering the beam search order). When a beam in which an SNR greater than or equal to a certain threshold is observed is found during the beam search, the beam search may be stopped. That is, the beam search may be performed more quickly through this operation. For example, suppose that each of the transmitting and receiving UEs has M beams. UE 1 and UE 2 determine N1 beams and N2 beams as possible beams in which LOS is likely to be present, through exchange of location information between the UEs. Each UE may first perform the procedure of searching for N1*N2 beams first. For example, UE1 sequentially transmits N1 beams, and UE2 measures SNR by switching between N2 receive beams when each beam is transmitted. For this purpose, the UEs or base station may signal the number of beams to be searched (e.g., N1, N2), and/or information about the beam search order to each other, rather than signaling the error of the location information to each other (or in addition to signaling the error of the location information to each other). If a beam exceeding a predetermined threshold is not found even after searching for all possible beams for LOS, an additional beam search procedure is performed. Then, if a beam exceeding the predetermined threshold is found, the beam search is stopped. Thereby, the beam search time may be reduced.

Figure 13:
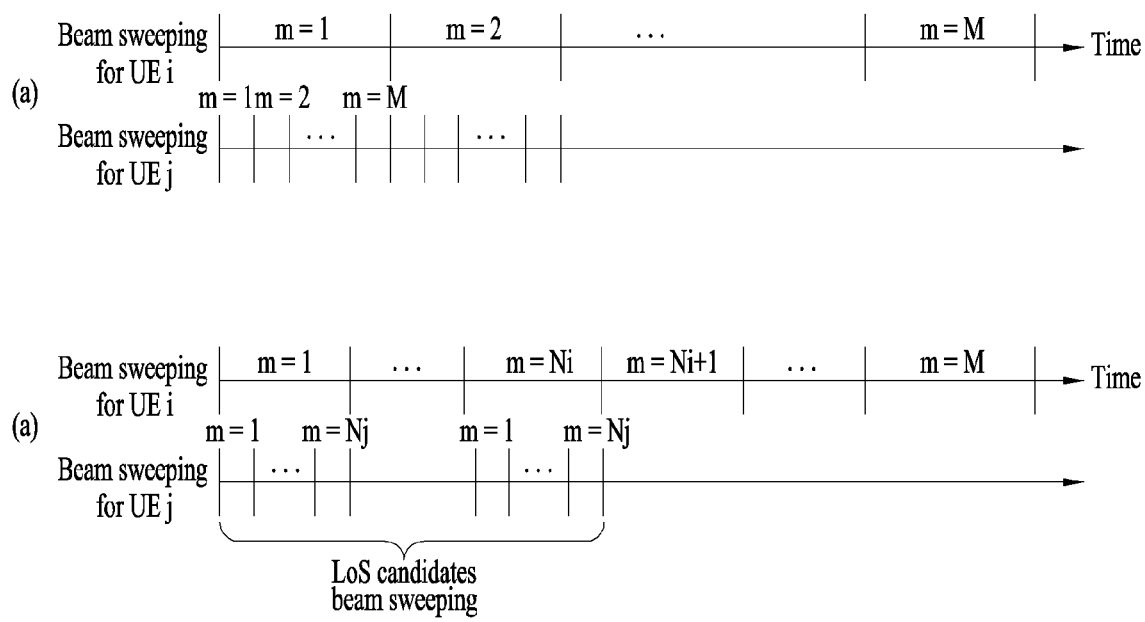
FIG. 13 illustrates a beam search order according to an embodiment of the present invention.

In FIG. 13, the order in which the first UE (UE i) and the second UE (UE j) sweep beams may be changed. Although UE j is illustrated in the figure as changing the beams more frequently, UE i may frequently change the beams, and UE j may change the beams less frequently. Alternatively, such an operation may occur alternately in each beam sweeping slot. All beams may be searched. In this case, the beam searching time may be reduced by searching for the regions where the LOS path is likely to exist first. Since a link between two UEs may be dominant on the NLOS path, it may be needed to perform an additional search procedure.

If an appropriate beam cannot be found among the LOS candidate beams, beams close to the LOS candidate beams may be preferentially searched. Even if the LOS path is blocked, the signal strengths from the surrounding beams is likely to be high, and therefore such beams are preferentially searched. In addition, all or part of the beam search order and the number of beams may be shared by the transmitting and receiving UEs.

When each UE identifies a range of a beam where the LoS is present by exchanging location information (expected location and/or location error information) with another UE with which the UE desires to communicate, it may signal to all or part of the range of the beam, the number of beams to be searched, the length of a time interval needed for beam refinement may be signaled to the other UE.

Figure 14:
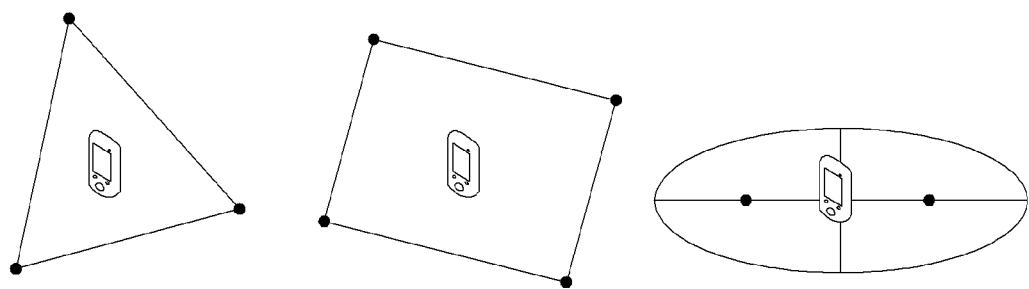
FIG. 14 illustrates types of error information according to an embodiment of the present invention.

The above-described error information may be information indicating that the error range is one of a polygon, a circle, or an ellipse. The error information may be expressed in the form of a circle (in the case of 2D) (or a sphere in the case of 3D). The UE may present the error information on its own location information in an elliptical, triangular, or rectangular shape as well as a circular shape shown in FIG. 14 and signal the same to UEs therearound.

If the error range is in a polygonal shape, the error information includes information indicating vertices of the polygon. If the error range is in a circular shape, the error information includes information indicating a center point and a radius. If the error range is in an elliptical shape, the error information may include information indicating two focal points and a focal distance. In other words, center point and radius information may be signaled in case of a circular shape, two focal points and the sum of the distances to the focal points may be signaled in case of an elliptical shape, positions of 3 points may be signaled in case of a triangular shape, positions of 4 points may be signaled in case of a rectangular shape. Error information (location error) may be presented in different shapes for UEs. A field indicating the shape of the error range (whether it is a circle, a triangle, a rectangle, or an ellipse) may be included in signaling.

The proposals are not limited to UE-to-UE communication, but may also be used between a UE and a base station. To this end, the base station may signal the location information thereabout to the UE using a physical layer or higher layer signal, and the UE may signal the location information thereabout, and/or the error information about the location information, and/or a measurement result (RSTD, RSRP, etc.) indicating the location information to the base station.

Figure 15:
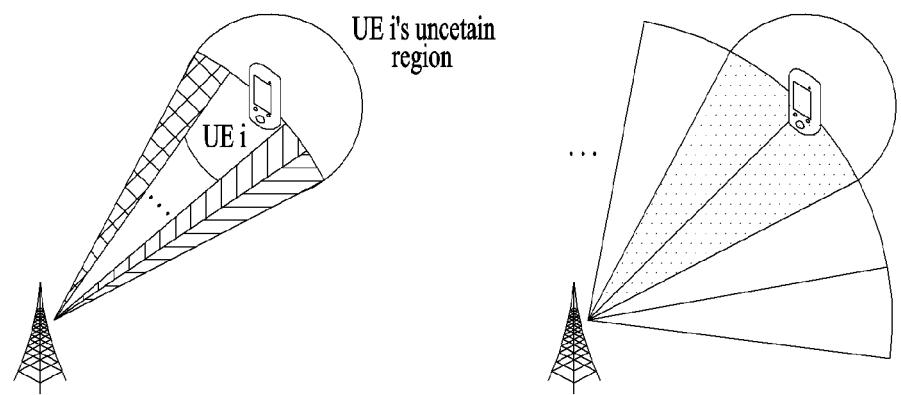
FIG. 15 illustrates beam search of a base station according to an embodiment of the present invention.

For example, when it is assumed that the location of the base station can be accurately recognized as shown in FIG. 15, only the uncertainty of the location of the UE affects configuration of the beam search range. The base station may perform fine beam search in the uncertain region of the UE as shown in FIG. 15(a), or may selectively search only a beam corresponding to a uncertain region (select only a beam corresponding to a region estimated as the location of the UE) in the omnidirectional beam search as shown in FIG. 15(b) to reduce the beam refinement time.

The above description is not limited to direct communication between UEs but may also be used on uplink or downlink. In this case, a base station or a relay node may use the above-described method.

It is apparent that examples of the proposed scheme described above may also be included as one of the implementation methods of the present invention, and thus may be regarded as a kind of proposed schemes. In addition, the proposed schemes described above may be implemented independently or in combination (or merge) of some of the proposed schemes. The information on whether to apply the proposed methods (or information on the rules of the proposed methods) may be defined in a manner that the base station shall deliver the information to the UE over a predefined signal (e.g., a physical layer signal or a higher layer signal), a transmitting UE shall signal the information to a receiving UE, or the receiving UE shall make a request for the information to the transmitting UE.

Embodiments

If the number of neighboring UEs around a terminal is excessively large (or an excessively large amount of interference is measured) in transmitting a signal, the individual UEs may reduce the influence on the neighboring UEs by changing the transmission power, the size of a frequency resource to be used, the size of a time resource to be used, a packet transmission period and the like. In this case, different transmission parameters may be determined according to the degree of importance (or priority) of the packets transmitted by the UEs. The operation of a UE of recognizing the surrounding situation and changing a transmission parameter as described above is referred to as congestion control.

For congestion control, the UE may measure a channel busy ratio CBR) to recognize the surrounding situation. The CBR may be defined as a ratio of resources determined to be in use to the entire resources. Whether each resource is in use may be determined by whether the received power or RSSI measured on the resource exceeds a certain threshold.

When SA and data are not adjacent in the frequency domain and are transmitted in a separate pool (e.g., resources spaced at a certain interval in the frequency domain), the CBR observed in the SA pool may be different from the CBR observed in the data pool. Particularly, in the 3GPP LTE Release 14 sidelink (transmission mode 3/4), the SA and the data are transmitted by frequency division multiplexing (FDM), wherein the SA may be given a power spectral density (PSD) offset of 3 dB. Further, while the SA is always transmitted using a determined number of RBs (2 RBs), data may be transmitted by selecting multiple subchannels. (Here, the subchannel may refer to a group of consecutive RBs, and the UE may perform sensing and resource selection on a subchannel-by-subchannel basis). In this case, CBR may be measured differently in the SA pool and the data pool.

In most cases, the measured CBR of the SA pool will be lower (assuming that a one-to-one relation is established between the subchannels of the SA and the data pool, when the SA always selects one resource, one UE can occupy multiple resources for the data at the same time, and accordingly the CBR of the SA may be generally low). In some cases, however, the measured CBR of the data pool may be higher than the CBR of the SA pool. For example, when the CBR of the data is measured, a threshold for each subchannel may not be exceeded due to wideband transmission. On the other hand, for the SA, if the RSSI threshold is exceeded due to the 3 dB boost, the CBR of the SA pool may be higher than the CBR of the data pool.

If the CBRs of the SA and the data are individually measured, the UE may perform the congestion control operation described below.

The UE may measure the CBR for each of the SA resource pool and the data resource pool, determine whether the CBR measured in the SA resource pool and the CBR measured in the data resource pool are greater than the CR limit (an indication of the number of sub-channels that one UE uses within a certain time), and transmit one or more of SA and data according to the result of the determination. For congestion control, congestion control parameters may be configured for each of the SA resource pool and the data resource pool. Here, the congestion control parameters may correspond to at least one of RB size, retransmission number, MCS, tx power, and CR_limit. The congestion control parameters will be described later.

In the case where the congestion control parameters are configured in each of the SA resource pool and the data resource pool, transmission of the SA is restricted when the CBR measured in the SA resource pool is greater than or equal to the CR limit set for the SA resource pool, and data transmission may be restricted when the CBR measured in the data resource pool is greater than or equal to the CR limit set for the data resource pool. Here, the restriction of transmission may have the following meaning: restricting transmission of the SA may be dropping retransmission of the SA, and restricting transmission of data may be dropping retransmission the data. The operation of dropping retransmission of the SA may be performed according to the retransmission number set in the SA resource pool, and the operation of dropping retransmission of the data may be performed according to the retransmission number set in the data resource pool. This may be about a dropping rule for initial transmission and retransmission for a specific MAC PDU. The description of the restriction of transmission may be applied to the overall contents described in the present disclosure.

In another scheme, transmission of the SA may be restricted if the CBR measured in the SA resource pool is greater than or equal to the smaller one of the CR limit set in the SA resource pool and the CR limit set in the data resource pool, and data transmission may be restricted if the CBR measured in the data resource pool is greater than or equal to the smaller one of the CR limit set in the SA resource pool and the CR limit set in the data resource pool. That is, the same CR limit is applied to SA and data. Specifically, whether to perform transmission may be determined based on the smaller one of the CR limits set in the SA pool and the data pool. In this case, the retransmission numbers of SA and data may always be adjusted together. Further, in this case, SA and data may always be transmitted in the same subframe. In addition, this scheme may address an issue (of failing to receive data) when only one of SA and data is received in a specific subframe. As another method to address this issue, a rule is defined such that when retransmission of the SA is dropped (by a CR limit), only the second SA to be transmitted is dropped. This method may enable the data transmitted for the second time to be decoded through the first SA and reduce the number of transmissions of the SA, thereby adjusting the CR limit in the SA pool. In other words, in this method, a separate CR limit may be applied to the SA pool and the data pool, and if dropping is configured in the SA pool, only the second SA allowed to be dropped. Thereby, the congestion level in the SA pool may be lowered.

As another method, if the CBR measured in the SA resource pool is greater than or equal to the CR limit set in the SA resource pool, or if the CBR measured in the data resource pool is greater than or equal to the CR limit set in the data resource pool, transmission of SA and transmission of data may be restricted. That is, if any of the CR limits of the SA pool and the data pool are met/violated, transmission of both data and SA is restricted. This method restricts both SA transmission and data transmission when it is difficult to achieve a target congestion level in any of the pools.

As another method, if the CBR measured in the SA resource pool is greater than or equal to the CR limit set in the SA resource pool, and the CBR measured in the data resource pool is greater than or equal to the CR limit set in the data resource pool, transmission of SA and transmission of data may be restricted. That is, when both the CR limits of the SA pool and the data pool meet/violate a threshold, transmission of both data and SA is restricted. This method is intended to increase occasions in which the receiving UE receives data by transmitting both data and SA when it is determined that transmission is possible in any of the data pool and the SA pool.

If a UE transmits only SA without transmitting data, the resource region other than the SA resource pool may be used for determination of resource reservation of the receiving UE. Here, the determination of resource reservation may be to determine whether an RSRP size exceeds a preset value. That is, the region is used to reserve resources when the congestion level is lowered and thus transmission of more data is allowed. However, since data is not actually transmitted in the resource region of the data resource pool, the RSRP measured in the SA resource pool may be regarded as an RSRP of a resource region other than the SA resource pool. In other words, if only the SA is successfully decoded in the sensing operation, the receive power of the data should be calculated through the SA, and the RSRP of the data may be calculated on the assumption that the RSRP of the SA is evenly distributed in the data. In this case, when a power offset is applied to the SA transmit power, the virtual RSRP may be calculated on the data RB.

If there is a significant difference in CBR between the SA pool and the data pool CBR, more dropping may be performed on either SA or data. When the effective transmission period differs between the data and the SA as described above, the transmission periods of SA and data may always be set to be equal to each other.

As an example of this case, if the number of transmissions needs to be reduced due to the CR limit when the CBRs of the SA pool and data pool are measured, transmission may be performed based on the smaller one of the CR limits for the SA pool and the data pool.

In conventional cases, when the CBR of the SA pool and the CBR of the data pool are measured and the maximum transmit power of the SA and the data are to be adjusted, a PSB offset of 3 dB is applied to the SA. However, if the congestion control parameter is configured independently, the power offset of 3 dB may not be achieved. In this case, the following two methods of setting transmit power may be used.

As a first method, the transmit power of SA and data is set based on the smaller one of the PSD thresholds (according to Tx power) of SA and data. It is assumed that the 3 dB offset is maintained at this time. Accordingly, when the 3 dB offset is applied to the PSD of the SA, the PSD is compared with the Tx power limit of the SA, and compared with the PSD of the data and the data Tx power limit. Then, the PSD (tx power) of the SA or the data is determined based on the smaller one of the power limits and the PSD of the other one is adjusted by the difference from the threshold.

As a second method, when the congestion control is applied, the powers of the SA and the data may be independently determined. With this method, the congestion levels of the SA pool and the data pool may be adjusted independently. However, if the SA power is significantly different from the data power, the packet reception ratio may be lowered.

The congestion control parameters disclosed above will be described in detail. The RB size, the retransmission number, the MCS, the tx power, and the CR_limit may be set in the SA pool and the data pool, separately/respectively. The parameters may be configured or preconfigured by the network. In congestion control of data, the RB size (RB size according to the subchannel size), retransmission number, MCS, tx power, and CR_limit may be adjusted. In the case of SA, the format is fixed, and accordingly the RB size and MCS cannot be changed. This is because changing the RB size or MCS of the SA requires the receiving UE to perform blind decoding on SAs of different formats, thereby increasing complexity. Therefore, in the case of SA, only CR limit, Tx power, and retransmission number are allowed to be adjusted. In the case of SA, it is impossible to use multiple SA frequency resources (e.g., 2 RBs) in one subframe, and accordingly only the retransmission number is allowed to be adjusted to change the CR limit.

When the CBRs of the SA pool and the data pool are different from each other, but only one congestion control parameter is given for the SA pool and the data pool (or the number of congestion control parameters for the SA pool and the data pool is one), the following methods may be used to calculate the CBRs of SA/data transmission.

As a first method, the weighted sum of the two CBRs is applied to a (pre)configured parameter. Here, the weighted parameter may be configured by the network or may be predefined. This method always allows one CBR to be measured even if the CBRs of the SA pool and the data pool are different from each other. As a second method, the minimum value of both CBRs is used. This method is to increase data transmission as much as possible using the smaller one of the CBRs of the SA pool and the data pool when the CBRs are different from each other. As a third method, the maximum value of both CBRs is used. This method is to perform congestion control on a pool having more congestion between the SA pool and the data pool. As another method, only the CBR of the data pool may always be used. This method makes it possible to perform the same operation as when the SA/data pools are adjacent to each other, and the operation of the UE may be simplified. The CBR of the SA pool is merely used for reporting to the network.

Excessive dropping for congestion control may cause a problem in sensing operation. If SA and/or data transmission is abandoned in periodic transmission, neighboring UEs may determine that the corresponding resource is not used and collision may take place between available resources. In order to address this issue, the CR limit may be re-defined such that a subchannel is used only when the transmit power in use is greater than or equal to a certain transmit power. In order for the UE to satisfy the CR limit configured by the network, a specific transmission may be configured to be performed at a transmit power less than a certain transmit power. Thereby, it may be determined that a UE at a very close distance is using the corresponding resource.

The above description is not limited to direct communication between UEs but may also be used on uplink or downlink. In this case, a base station or a relay node may use the above-described method.

It is apparent that examples of the proposed scheme described above may also be included as one of the implementation methods of the present invention, and thus may be regarded as a kind of proposed schemes. In addition, the proposed schemes described above may be implemented independently or in combination (or merge) of some of the proposed schemes. The information on whether to apply the proposed methods (or information on the rules of the proposed methods) may be defined in a manner that the base station shall deliver the information to the UE over a predefined signal (e.g., a physical layer signal or a higher layer signal), a transmitting UE shall signal the information to a receiving UE, or the receiving UE shall make a request for the information to the transmitting UE.

Device Configuration According to Embodiments of the Present Invention

Figure 16:
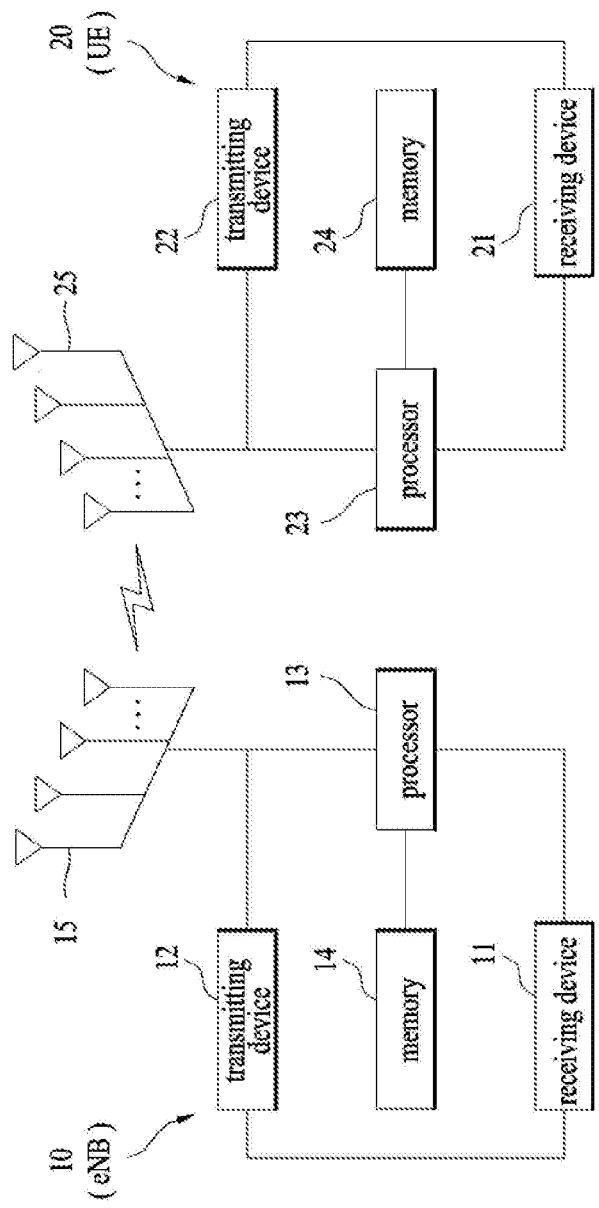
FIG. 16 is a diagram showing a configuration of a transmission device and a reception device.

FIG. 16 is a diagram showing a configuration of a transmission point apparatus and a UE according to an embodiment of the present invention.

Referring to FIG. 16, a transmission point apparatus 10 may include a receiver 11, a transmitter 12, a processor 13, a memory 14, and a plurality of antennas 15. The plurality of antennas 15 represents the transmission point apparatus supporting MIMO transmission/reception. The receiver 11 may receive various kinds of signals, data and information on the uplink from the UE. The transmitter 12 may transmit various kinds of signals, data and information on the downlink to the UE. The processor 13 may control overall operation of the transmission point apparatus 10. The processor 13 of the transmission point apparatus 10 according to one embodiment may process necessary details in each of the above-described embodiments.

The processor 13 of the transmission point apparatus 10 may also perform a function of computationally processing information received by the transmission point apparatus 10 and information to be transmitted to the outside, and the memory 14 may store the computationally processed information and the like for a predetermined time, and may be replaced by a component such as a buffer (not shown).

Next, referring to FIG. 16, a UE 20 may include a receiver 21, a transmitter 22, a processor 23, a memory 24, and a plurality of antennas 25 have. The plurality of antennas 25 represents the UE supporting MIMO transmission/reception. The receiver 21 may receive various kinds of signals, data and information on the downlink from a base station. The transmitter 22 may transmit various kinds of signals, data and information on the uplink to the base station. The processor 23 may control overall operation of the UE 20.

The processor 23 of the UE 20 according to one embodiment may process necessary details in each of the above-described embodiments. Specifically, the processor may receive error information related to the location of a second UE, determine one or more of a beam direction, a range for performing beam search, and an order in which the beam search is to be performed using the error information about the second UE, perform beam search according to the determination, and transmit a signal to the second UE through beamforming according to a result of the beam search. The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present invention may be applied independently or implemented such that two or more of the embodiments are applied at the same time. For clarity, redundant description is omitted.

In the example of FIG. 16, the description of the transmission point apparatus 10 may also be applied to a relay device as a downlink transmission entity or an uplink reception entity, and the description of the UE 20 may also be applied to a relay device as a downlink reception entity or an uplink transmission entity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is apparent to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method for transmitting, by a terminal, scheduling assignment (SA) and data associated with congestion control in a wireless communication system, the method comprising:

measuring a channel busy ratio (CBR) in each of an SA resource pool and a data resource pool; and determining whether the CBR measured in the SA resource pool and the CBR measured in the data resource pool are greater than or equal to a Channel Occupancy Ratio (CR) limit and transmitting one or more of the SA and the data according to a result of the determination, wherein first congestion control parameters are configured to the SA resource pool and second congestion control parameters are configured to the data resource pool, wherein when the terminal transmits only the SA without transmitting the data, a resource region other than the SA resource pool is used for determination of resource reservation of a receiving terminal.

2. The method of claim 1, wherein transmission of the SA is restricted when the CBR measured in the SA resource pool is greater than or equal to a CR limit set in the SA resource pool, and transmission of data is restricted when the CBR measured in the data resource pool is greater than or equal to a CR limit set in the data resource pool.

3. The method of claim 1, wherein, when the CBR measured in the SA resource pool is greater than or equal to a CR limit set in the SA resource pool, or the CBR measured in the data resource pool is greater than or equal to a CR limit set in the data resource pool, transmission of the SA and transmission of the data are restricted.

4. The method of claim 1, wherein, when the CBR measured in the SA resource pool is greater than or equal to a CR limit set in the SA resource pool and the CBR measured in the data resource pool is greater than or equal to a CR limit set in the data resource pool, transmission of the SA and transmission of the data are restricted.

5. The method of claim 2, wherein the transmission of the SA is restricted by dropping retransmission of the SA, and the transmission of the data is restricted by dropping retransmission of the data.

6. The method of claim 5, wherein the dropping of the retransmission of the SA is performed according to a retransmission number set in the SA resource pool, and the dropping of the retransmission of the data is performed according to a retransmission number set in the data resource pool.

7. The method of claim 1, wherein the determination of the resource reservation is to determine whether a Reference Signal Received Power (RSRP) size exceeds a preset value.

8. The method of claim 1, wherein an RSRP measured in the SA resource pool is regarded as an RSRP in the resource region other than the SA resource pool.

9. The method of claim 1, wherein the SA resource pool and the data resource pool are not adjacent to each other in the frequency domain.

10. The method of claim 1, wherein each of the first congestion control parameters and the second congestion control parameters comprises one or more of Resource Block (RB) size, retransmission number, Modulation Coding Scheme (MCS), transmitting (TX) power, and CR_limit.

11. A terminal for transmitting scheduling assignment (SA) and data associated with congestion control in a wireless communication system, the terminal comprising:
a transmission device and a reception device; and
a processor,
wherein the processor is configured to:
measure a channel busy ratio (CBR) in each of an SA resource pool and a data resource pool; and
determine whether the CBR measured in the SA resource pool and the CBR measured in the data resource pool are greater than or equal to a Channel Occupancy Ratio (CR) limit and transmit one or more of the SA and the data according to a result of the determination,
wherein first congestion control parameters are configured to the SA resource pool and second congestion control parameters are configured to the data resource pool,
wherein when the terminal transmits only the SA without transmitting the data, a resource region other than the SA resource pool is used for determination of resource reservation of a receiving terminal.

* * * * *